INVENTOR.
JOHN GEORGE LEPISTO,

United States Patent Office 3,488,244
Patented Jan. 6, 1970

3,488,244
HEAT SEALING APPARATUS
John George Lepisto, Middletown, Ohio, assignor to Albemarle Paper Manufacturing Company, Richmond, Va., a corporation of Virginia
Filed Jan. 21, 1965, Ser. No. 426,979
Int. Cl. G05g 15/00; B32b 31/26, 31/20
U.S. Cl. 156—359
7 Claims

ABSTRACT OF THE DISCLOSURE

Apparatus for the continuous sealing together or welding inherently heat-sealable material or materials to which heat sealing properties have been imparted by means of heated air under pressure.

---

While various devices have hitherto been proposed for welding together such heat-sealable materials, numerous difficulties have been encountered in providing a reliable heat seal. If the surfaces to be sealed are compressed between heated sealing bars, the material will stick to the bars if they are sufficiently hot to effect a rapid seal, and while attempts have been made to eliminate the tendency of the heat-sealable material to stick to the heated pressure bars by covering their surfaces with a release agent, such efforts have been unsatisfactory. Efforts have also been made to effect a seal by utilizing heated air as a sealing medium, the heated air being caused to impinge against the material being sealed either in the form of a plurality of jets or streams, or by enclosing the area to be sealed in an airtight chamber to which heated air is introduced. Where a plurality of streams or jets of air are employed either as the means of carrying heated air to the area to be sealed, or as a means for conveying the material to be sealed over the sealing elements, it has been found that the heated air is dissipated over a relatively uncontrolled area resulting in the loss of a sharply defined seal line, thereby producing a seal of non-uniform and often inferior quality. In addition, such procedures are generally accompanied by insufficient control of temperature and pressure on the material being sealed to obtain uniform strength throughout the full length and width of the seal. Where the seal is effected in a closed chamber, the advantages of a continuous high speed operation are lost, together with problems attendant with the effecting of the necessary tight seal between the chamber and the material being sealed. The use of radiant heating means has also been proposed, but such means require the use of traveling bands interposed between the radiant heaters and the material being sealed, which bands present problems in providing uniform sealing pressures. In addition, radiant heating means are quite expensive to operate due to the amount of electrical current required.

In contrast to the foregoing, the instant invention contemplates the provision of what may be termed an air float sealer wherein air under pressure is applied to the seam area in a uniform and controlled manner and at a carefully controlled temperature, thereby resulting in a uniform and sharply defined seam.

A principal object of the instant invention is the provision of heat sealing apparatus embodying heating shoes having sealing surfaces composed of sintered or porous metal through which the heated air is discharged, the construction of the heating shoes being such that the exposed sealing surfaces will define the width of the seal being formed, the remainder of the shoes being sealed against the passage of air therethrough.

A further object of the invention is the provision of a heating shoe which is so constructed that a conventional electric heating rod may be inserted therein, the shoe incorporating air channels which cause the air to pass in close proximity to the heating element but without the air actually coming in contact with the heating element or entering the heating compartment.

A further object of the invention is the provision of a thermocouple sensing unit operatively connected to the heating shoes for accurately controlling the temperature of the shoes, the thermocouple sensing unit being mounted in such a way that the air channels do not pass between the thermocouple and the heating elements so as to adversely effect the accuracy of the temperature control.

Still a further object of the invention is the provision of a heating shoe construction which, when the material to be sealed is interposed between a closely spaced pair of the heating shoes, provides a discrete film or layer of air between the sealing surfaces of the shoes and the material being sealed, which air film extends throughout the exposed face of the porous sealing surface and exerts uniform pressure against the material being sealed without outward spreading of the air barrier beyond the periphery of the sealing surface. The air film thus provides a barrier or cushion which permits the material being sealed to pass between the heating shoes without actual physical contact with the sealing surfaces, while at the same time applying uniform pressure to the material to effect a pressure seal the strength of which is at least equal to the strength of the material being sealed.

Still a further object of the invention is the provision of heat sealing apparatus which also embodies cooling shoes constructed in a similar manner, with either the heating elements replaced by coils containing a cooling medium and/or the use of refrigerated air to form a pressure barrier between the porous surfaces of the cooling shoes and the seam line in the material being sealed.

Still another object of the invention is the provision of heat sealing apparatus particularly suited to close and seal the ends of a tubular bag structure, such as a polyethylene tube, where such tube is to be used alone or as a liner for a single or multi-ply paper bag wherein the liner is sealed through the surrounding paper plies. Where the apparatus is to be used to seal the bottom ends of the bags, it can be adapted for use in conjunction with bag forming mechanism wherein the bag forming material is formed into tubular lengths and the bottom ends of the bags stitched and sealed; and the apparatus may also be incorporated in mechanism for sealing and stitching the mouth ends of such bags after they have ben filled.

The foregoing together with other objects of the invention which will appear hereinafter or which will be apparent to the skilled worker in the art upon reading these specifications, are accomplished by that construction and arrangement of parts of which an exemplary embodiment shall now be described.

Reference is made to the accompanying drawings wherein.

Figure 1:
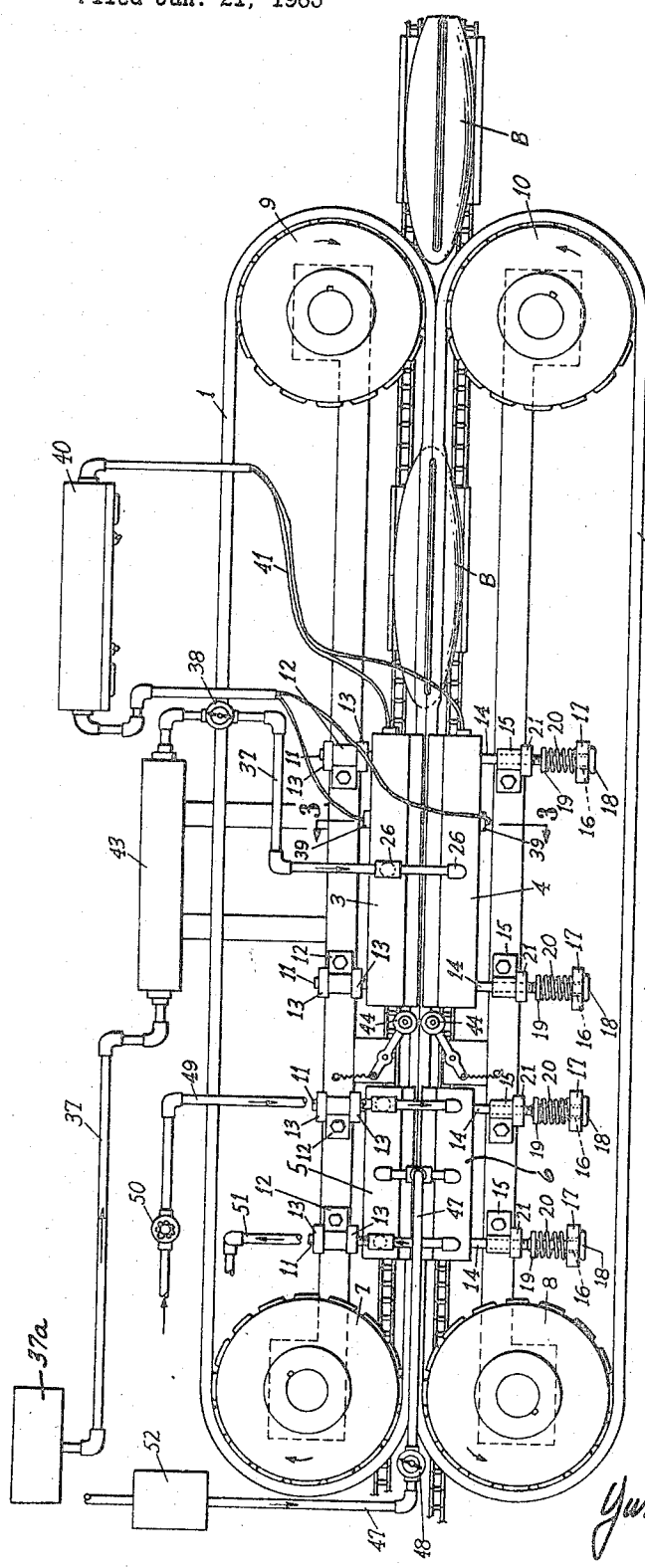
FIGURE 1 is a schematic plan view illustrating bag sealing apparatus incorporating heat sealing and cooling means in accordance with the instant invention.

Referring first to FIGURE 1 of the drawings, the apparatus illustrated relates to a heat sealing unit for closing and sealing the mouth ends of bags B which have already been filled, the bags being conveyed in upright position with their uppermost ends projecting freely upwardly. Usually, the bags will be advanced on a conveyor means provided with suitable side guides to maintain the bags upright, as will be understood by the worker in the art; and additional guides or sweeps may be provided to juxtapose the opposite walls of the bags so as to align them for passage between a pair of gripping belts 1 and 2 which engage and hold the bags in an area lying beneath the area to be sealed. The belts 1 and 2 are merely for guiding purposes and do not perform any sealing function as such. Rather, the belts simply position the bag ends for passage between the heating shoes 3 and 4 and the cooling shoes 5 and 6, whereupon the belts pass around trailing sheaves or rolls 7 and 8 for return to the leading sheaves or rolls 9 and 10 where they engage and guide the mouth of a succeeding bag.

The heating shoe 3 has a pair of threaded mounting rods 11 projecting rearwardly therefrom where they are received in brackets 12, the mounting rods having sets of adjustment screws 13 by means of which they are secured to the brackets. The opposing heating shoe 4 is also provided with threaded mounting rods 14, but in this instance the rods extend through the mounting brackets 15 with their outermost ends projecting through openings 16 in lugs 17 where they terminate in enlarged heads 18. The rods have collars 19 mounted thereon intermediate the brackets 15 and lugs 17, with compression springs 20 surrounding the rods and extending between the lugs 17 and the collars 19, the springs thus serving to urge the rods 14 and the heating shoe 4 mounted thereon toward the opposing heating shoe 3. Adjustment nuts 21 serve as stops limiting the movement of the sealing shoe 4 in the direction of the shoe 3; and it will be evident that the spacing between the shoes 3 and 4 may be varied by altering the position of the adjustment nuts 21.

The cooling shoes 5 and 6 will be mounted in substantially the identical manner as the heating shoes 3 and 4, respectively, and for purposes of simplicity like parts have been given like reference numerals.

Figure 2:
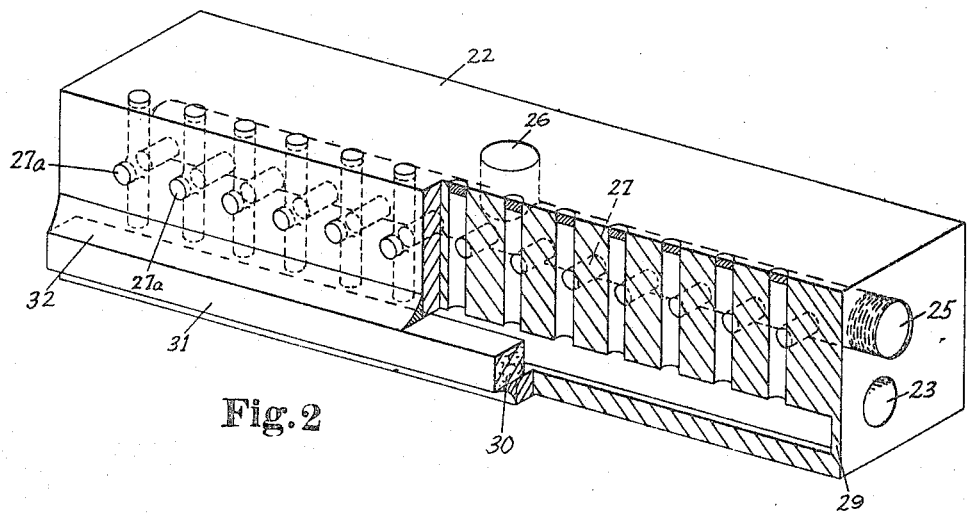
FIGURE 2 is a perspective view with parts broken away illustrating the construction of the heating and cooling shoes.
Figure 3:
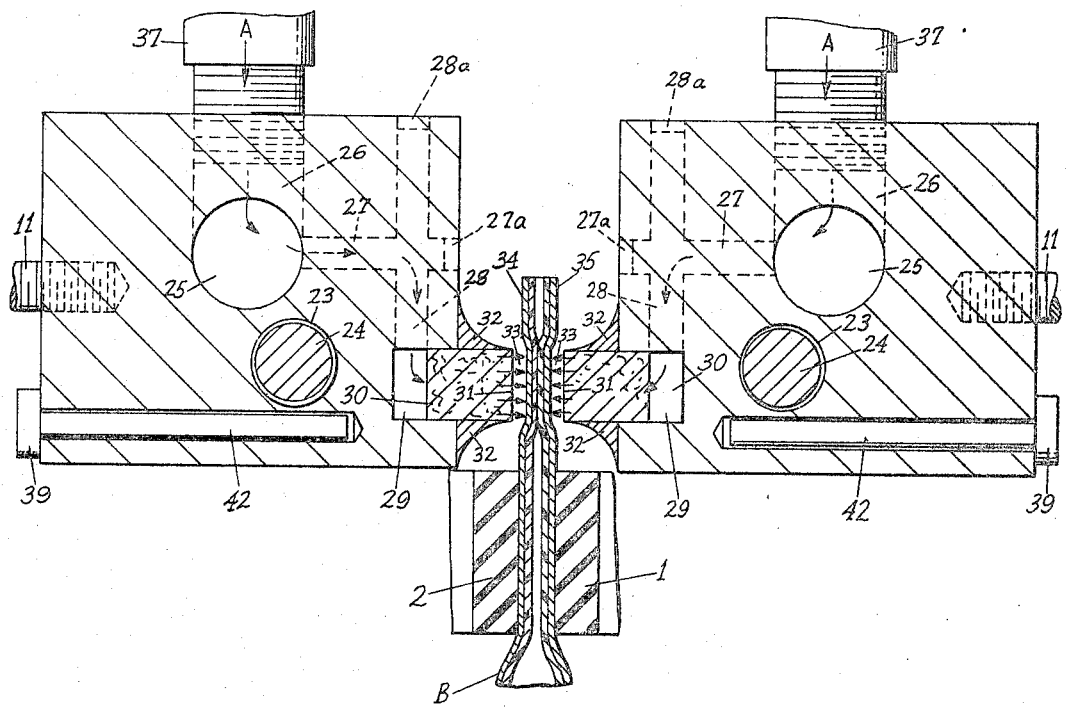
FIGURE 3 is an enlarged fragmentary section view taken along the line 3—3 of FIGURE 1 illustrating the manner in which the porous sealing surfaces of an opposed pair of heating shoes coact to seal a bag or liner interposed therebetween.

Referring now to FIGURE 2 of the drawings, the heating shoes 3 and 4 each comprise a metallic body 22 which may be conveniently formed from a solid steel blank having an axial bore 23 extending therethrough which is of a size to receive an elongated cartridge or rod type heating element 24, as indicated in FIGURE 3. A second axial bore 25 extends lengthwise of the body 22 and lies in close proximity to the bore 23. It is joined intermediate its ends by a short cross-bore 26 which constitutes an air inlet. A series of smaller diameter passageways 27 project laterally from the axial bore 25 where they connect with vertical passageways 28 which open downwardly into a longitudinal channel or recess 29. The passageways 27 and 28 may be conveniently bored in the body 22 and their ends plugged, as at 27a and 28a, thereby providing continuous passageways leading to the channel 29.

A porous metal insert 30 is fitted in the channel 29 and extends lengthwise of the heating shoe, the insert having an exposed sealing surface 31. The top, bottom and end surfaces of the insert projecting outwardly from the heating shoe will be closed to the passage of air therethrough, as by means of silver solder fillets 32 which seal all but the sealing surface 31. The inserts 30 will be formed from a porous metal, such as dry Oilite porous bronze, and, in the case of the heating shoes, a porosity range of 14–24 percent has been found to produce highly satisfactory results.

The operation of the shoes will be evident from FIGURE 3 wherein it will be seen that air under pressure, indicated by the arrows A, enters the shoes through the cross-bore 26 and is distributed lengthwise of the shoe through axial bore 25 for passage through the passageways 27 and 28 which serve to evenly distribute the air throughout the length of the longitudinal channel 29 so that the air enters the exposed rear surface of insert 30 at spaced apart intervals. It will be noted that the passageways through which the air flows lie in close proximity to the heating element 24, the arrangement being such that the air will be retained in the heating shoe for a length of time sufficient to bring it to the desired sealing temperature, the air being uniformly heated throughout the length of the shoe. This arrangement provides more accurate control over the temperature of the air than if it were brought into direct contact with the heating element, as where the air would be introduced into a chamber containing the heating element.

The heated air discharged through the sealing surface 31 of the insert forms a pressure layer or air film 33 which impinges against the opposite wall surfaces 34 and 35 of the bag 36, the pressure layers of air serving to heat the areas of the bag contacted thereby and fuse them together to form the seal. The sealed area is of uniform width and conforms to the width of the sealing surfaces 31. While the discharged air immediately dissipates into the surrounding atmosphere, the continuity of flow nonetheless maintains the integrity of the pressure layers as if they were of static character; and the pressurized air films not only permit the material being sealed to pass between the heating shoes without actual physical contact with the inserts, but also exert sealing pressure sufficient to effect a strength of seal at least equal to the strength of the material being sealed.

Referring again to FIGURE 1, air under pressure will be supplied to the heating shoes from source 37a through a conduit 37 connected to the inlet passageways 26 of the heating shoes, the conduit 37 having a pressure control valve 38 for controlling the pressure of the air pressure control valve 38 for controlling the pressure of the air introduced into the shoes. In an examplary embodiment, such air pressure will be on the order of 80 pounds per square inch gauge, which has proven to be highly effective where the porous metal has a porosity within the range previously indicated. It is to be understood however, that the pressure at which the air is introduced may be varied to suit operating conditions.

In order to insure accurate temperature control, the heating shoes are provided with thermocouples 39 operatively connected to temperature controller 40 which through suitable circuitry 41 controls the supply of electrical current to the heating element 24. As will be apparent from FIGURE 3, the thermocouples 39 are received in lateral bores 42 in the heating shoes, such bores being positioned to accurately reflect the temperature of the heating shoes without being influenced by the passage of air through the various passageways in the shoes. Such arrangement insures greater accuracy in the thermostatic control of the heating elements. If desired, an air preheater may be interposed in the supply conduit 37 to preheat the air prior to its passage through the heating shoes, such preheater being indicated at 43 in FIGURE 1.

Upon passage of the bags being sealed beyond the trailing ends of the heating shoes, the area which has been sealed is preferably contacted by an opposing pair of ironing rolls 44 which act to insure the integrity of the seal. The ironing rolls will be adjustably mounted and one or both may be spring biased so as to develop the desired ironing pressure. Teflon rolls have been found to be particularly suitable for the purpose.

The cooling shoes 5 and 6 which, as already indicated, are of essentially identical construction as the heating shoes, have their inserts positioned to coincide with the seal formed by the heating shoes. The cooling shoes develop pressure layers or air films of cool air which maintain the pressure contact between the sealed areas while the heat sealable material sets. Air under pressure will be supplied to the cooling shoes through conduit 47 having control valve 48 by means of which the air pressure may be regulated. In the event a coolant is to be circulated through the axial bore 23 in the cooling shoes, a water supply conduit 49 having a control valve 50 will be connected to one end of the axial bore 23 of the cooling shoes, whereas the opposite ends of the bores will be connected to a discharge conduit 51. Alternatively, an air refrigerating unit 52 may be interposed in the air supply conduit 47 to cool the air flowing through the cooling shoes; and if desired, both a cooling fluid and precooled air may be employed if the conditions of use require extreme cooling of the seal. Cooling efficiency may be additionally increased by employing a more porous metal for the inserts than is employed in the heating shoes.

As should now be apparent, the instant invention while employing air under pressure as a sealing and pressing medium, does not rely on air jets or similar orifices to deliver heated air to the seal area, or as a means of conveying the materials to be sealed over the sealing elements. Rather, by employing porous metal inserts constructed in accordance with the instant invention a well defined, uniform pressure layer or air film is established between the heating shoes and the opposite sides of the material being sealed. The construction provides accurate control over both heat and pressure and assures uniformity throughout the entire sealing area. The efficiency of the construction permits the use of shorter lengths of heating and cooling shoes at the same temperature settings than would be possible using conventional heating and cooling means, thereby making it possible to install the sealing equipment on shorter conveyors lengths. The increased heating and pressure efficiency of the instant apparatus has made it possible to effectively seal multiple plies of heat sealable films of various types, inclusive of materials such as polyvinyl chloride compounds, which could not be effectively sealed on equipment employing heat transfer bands.

Modifications may be made in the invention without departing from its spirit and purpose. Various modifications have already been set forth and others will be readily apparent to the skilled worker in the art.

As has already been indicated, the inevntion will find utility in diverse applications wherein heat-sealable surfaces are to be joined to form a dependable seal, irrespective of the number of such layers or the presence of additional layers of material which may not be involved in the heat sealing operation, as where the heat-sealable material comprises a liner surrounded by one or more plies of paper or other bag forming material.

The embodiments of the invention in which an exclusive property or privilege is claimed are defined as follows:

1. In apparatus for sealing together juxtaposed areas of heat-sealable material, an opposing pair of shoe members, means for continuously passing the material to be sealed between said shoe members, each of said shoes having a heat conductive body including a porous metal insert capable of passing air therethrough projecting outwardly from the surface of said body facing the other of said shoe members, said insert having an outermost planar sealing surface, the remaining externally exposed surfaces of said insert being sealed against the flow of air therethrough, passageways in said body for delivering air under pressure to said insert for discharge through said planar sealing surface directly on said material to be ealed, means supplying air to said passageways at a rate sufficient to effect a pressure seal at the sealing areas, and heating means within said body for heating the air as it flows through said passageways.

2. In apparatus for sealing together juxtaposed areas of heat-sealable material, an opposing pair of elongated shoe members, means for continuously passing the material to be sealed between said shoe members, each of said shoes having a heat conductive body including a porous metal insert capable of passing air therethrough directly onto said material to be sealed, said insert extending lengthwise of said body and projecting outwardly from the surface thereof facing the other of said shoe members, said insert having an outermost planar sealing surface, the remaining externally exposed surfaces of said insert being sealed against the flow of air therethrough, a series of passageways in said body for delivering air under pressure to said insert at spaced apart intervals throughout its length, means supplying air to said passageways at a rate sufficient to effect a pressure seal at the sealing areas, and heating means extending lengthwise of said body for heating the air as it flows through said passageways, said heating means lying in substantially uniform spaced relationship to said series of passageways.

3. The apparatus claimed in claim 2 including temperature sensing means mounted on said body in spaced relation to said heating means, said temperature sensing means being positioned so as to be free from the influence of heated air flowing through said passageways.

4. The apparatus claimed in claim 3 including conduit means operatively connecting said passageways to said air supplying means, and means for preheating the air as it flows through said conduit means.

5. In apparatus for sealing together juxtaposed areas of heat-sealable material, an opposing pair of heating shoes and an opposing pair of cooling shoes, means for continuously passing the material to be sealed between said pair of heating shoes and said pair of cooling shoes successively, each of said shoes having a metallic body including a porous metal insert capable of passing air therethrough projecting outwardly from the surface of said body facing the opposing shoe member, said insert having an outermost planar sealing surface, the remaining externally exposed surfaces of the insert being sealed against the flow of air therethrough, passageways in said body for delivering air under pressure to said insert for discharge through said planar sealing surface directly onto said material to be sealed, means supplying air to said passageways at a rate sufficient to effect a pressure seal at the sealing areas, and heating means within the bodies of said heating shoes for heating the air as it flows through the passageways therein, and cooling means within the bodies of said cooling shoes for cooling the air as it flows through the passageways therein.

6. The apparatus claimed in claim 5 including a pair of ironing rolls positioned intermediate said heating and cooling shoes for contacting the opposite sides of the material being sealed in the area of the seam formed therein.

7. In apparatus for sealing together juxtaposed areas of heat-sealable material, an opposing pair of elongated heating shoes between which the materials to be sealed is passed, means mounting at least one of said shoes for adjusting movement toward and away from the other of said shoes, each of said shoes having a metallic body, a longitudinal channel in said body opening outwardly from the surface thereof facing the other of said shoes, a porous metal insert capable of passing air therethrough fitted in said channel and projecting outwardly therefrom, said insert having an outermost planar sealing surface, the remaining externally exposed surfaces of said insert being sealed against the flow of air, a longitudinal passageway in said body spaced inwardly from said longitudinal channel, a heating element in said longitudinal passageway, additional passageways in said body opening at their discharge ends into said longitudinal channel and connected at their opposite ends to a source of air under pressure, said additional passageways being spaced from each other and arranged to discharge air into said longitudinal channel at spaced apart intervals throughout its length, said additional passageways being spaced from the longitudinal passageway containing said heating element by a substantially uniform distance, whereby air under sufficient pressure to effect a pressure seal at the sealing areas will be uniformly heated as it flows through said additional passageways to said longitudinal channel and air discharged in said channel will be uniformly distributed throughout the length thereof for passage through said porous metal insert so as to be discharged from the sealing surface thereof at a uniform temperature and pressure.

References Cited

UNITED STATES PATENTS

| | | | |
|---|---|---|---|
| 2,800,162 | 7/1957 | Rohdin | 156—498 XR |
| 3,131,623 | 5/1964 | Seefluth | 53—373 XR |
| 3,311,525 | 3/1967 | Fanuzz et al. | 156—497 |
| 3,340,795 | 9/1967 | Hartley | 156—497 XR |

HAROLD ANSHER, Primary Examiner

JOSEPH C. GIL, Assistant Examiner

U.S. Cl. X.R.

53—373, 375; 156—311, 497, 498, 499